(12) United States Patent
Berkey et al.

(10) Patent No.: US 11,414,172 B2
(45) Date of Patent: Aug. 16, 2022

(54) FASTENER-LESS FRAME INSTALLATION IN A COMPOSITE STRUCTURE

(71) Applicant: THE BOEING COMPANY, Chicago, IL (US)

(72) Inventors: Tyler E. Berkey, Charleston, SC (US); Charles D. Peyton, Summerville, SC (US)

(73) Assignee: THE BOEING COMPANY, Chicago, IL (US)

( * ) Notice: Subject to any disclaimer, the term of this patent is extended or adjusted under 35 U.S.C. 154(b) by 317 days.

(21) Appl. No.: 16/739,415

(22) Filed: Jan. 10, 2020

(65) Prior Publication Data

US 2021/0214064 A1 Jul. 15, 2021

(51) Int. Cl.
| | | |
|---|---|---|
| *B64C 1/12* | (2006.01) | |
| *B29C 65/02* | (2006.01) | |
| *B64F 5/10* | (2017.01) | |
| *B29L 31/30* | (2006.01) | |
| *B29C 70/44* | (2006.01) | |

(52) U.S. Cl.
CPC ............... *B64C 1/12* (2013.01); *B29C 65/02* (2013.01); *B29C 70/446* (2013.01); *B64F 5/10* (2017.01); *B29L 2031/3082* (2013.01)

(58) Field of Classification Search
None
See application file for complete search history.

(56) References Cited

U.S. PATENT DOCUMENTS

| | | | |
|---|---|---|---|
| 2006/0231682 A1* | 10/2006 | Sarh | B64C 1/068 244/119 |
| 2015/0202824 A1* | 7/2015 | De Mattia | B29C 33/308 264/299 |
| 2016/0101576 A1* | 4/2016 | Joern | B32B 5/18 244/133 |

* cited by examiner

*Primary Examiner* — Barbara J Musser
(74) *Attorney, Agent, or Firm* — Marshall, Gerstein & Borun LLP (57) ABSTRACT

A shear tie connector system for securing a frame component to a composite fuselage skin, which includes a shear tie connector and a fuselage mandrel, which defines a slot within which the shear tie connector is positioned.

20 Claims, 8 Drawing Sheets

FASTENER-LESS FRAME INSTALLATION IN A COMPOSITE STRUCTURE

FIELD

This disclosure relates to securing structures to a composite wall and more particularly securing interior structures of an aircraft, such as a frame, to a composite fuselage skin with a connector.

BACKGROUND

In fabrication of an aircraft, interior structures of the aircraft, such as frame components are secured to composite fuselage skin of the aircraft. In securing the frame components to the composite fuselage skin, straight shank fasteners are positioned through the skin, from an exterior side of the skin, to secure to a shear tie connector positioned on an interior side of the composite fuselage skin. The shear tie connector, in turn, is secured with a fastener to frame components in the interior of the aircraft.

In securing the frame components of the aircraft to composite fuselage skin, the process requires drilling holes through the composite fuselage skin and through a skin side portion of the shear tie connector. The shear tie connector is secured to the composite fuselage skin with a fastener having a straight shank and a sealant is also applied to seal the hole made in the composite fuselage skin. Another hole is drilled in a frame side portion of the shear tie connector and the frame component is connected to the frame side of the shear tie often with a straight shank fastener.

The assembling of an aircraft requires drilling numerous holes through the composite fuselage skin. The drilling of holes through the composite fuselage skin, through a skin side of the shear tie connector and securing the shear tie connectors with fasteners positioned through the composite fuselage skin are time consuming tasks. The numerous fasteners employed in securing the shear tie connectors to the composite fuselage skin contribute significant weight to the aircraft along with the weight contribution from the sealant that is used in conjunction with the fastener connection. Further drilling of holes in the frame side of the shear tie connector is also needed in order to connect the frame component, through a hole within the frame component, with a straight shank fastener.

Drilling numerous holes through the composite fuselage skin weakens the fuselage structure. Without having to drill holes to connect the composite fuselage skin to a shear tie connector, the fuselage structure would be relatively a stronger structure. As a result, the composite fuselage skin could be constructed to be thinner to provide the required strength of the composite fuselage skin. In addition, a thinner fuselage construction of the composite fuselage skin would contribute less weight and result in less cost to construct the aircraft and to operate the aircraft. Also, without the drilled holes extending through the composite fuselage skin, the air pressure within the aircraft can be better contained and potentially permit pressurization for the passengers at a lower altitude for additional comfort.

As a result, there is a need to construct an aircraft having a composite skin fuselage so as not to have numerous holes penetrating through the fuselage skin and still secure the frame components of the aircraft to the composite fuselage skin. The elimination of such holes that facilitated the securement of the frame components to the composite fuselage would reduce the time and cost of constructing the aircraft. In addition, the elimination of the fasteners employed for the securement of the shear tie connectors would reduce the weight of the aircraft along with operational costs associated with the aircraft and provide an opportunity for increased in operation comfort for the passengers.

SUMMARY

An example includes a shear tie connector system for securing a frame component to a composite fuselage skin, which includes a shear tie connector and a fuselage mandrel, which defines a slot within which the shear tie connector is positioned.

An example includes a method for installing a shear tie connector system, which includes positioning a shear tie connector into a slot defined by a fuselage mandrel.

The features, functions, and advantages that have been discussed can be achieved independently in various embodiments or may be combined in yet other embodiments further details of which can be seen with reference to the following description and drawings.

DESCRIPTION

As discussed earlier, there is a need to construct an aircraft having a composite skin fuselage such that the composite skin fuselage does not have numerous holes penetrating through the composite fuselage skin and yet still secure the frames of the aircraft to the composite fuselage skin. Such construction would provide a number of cost saving benefits with respect to fabrication and operation of the aircraft.

Figure 1:
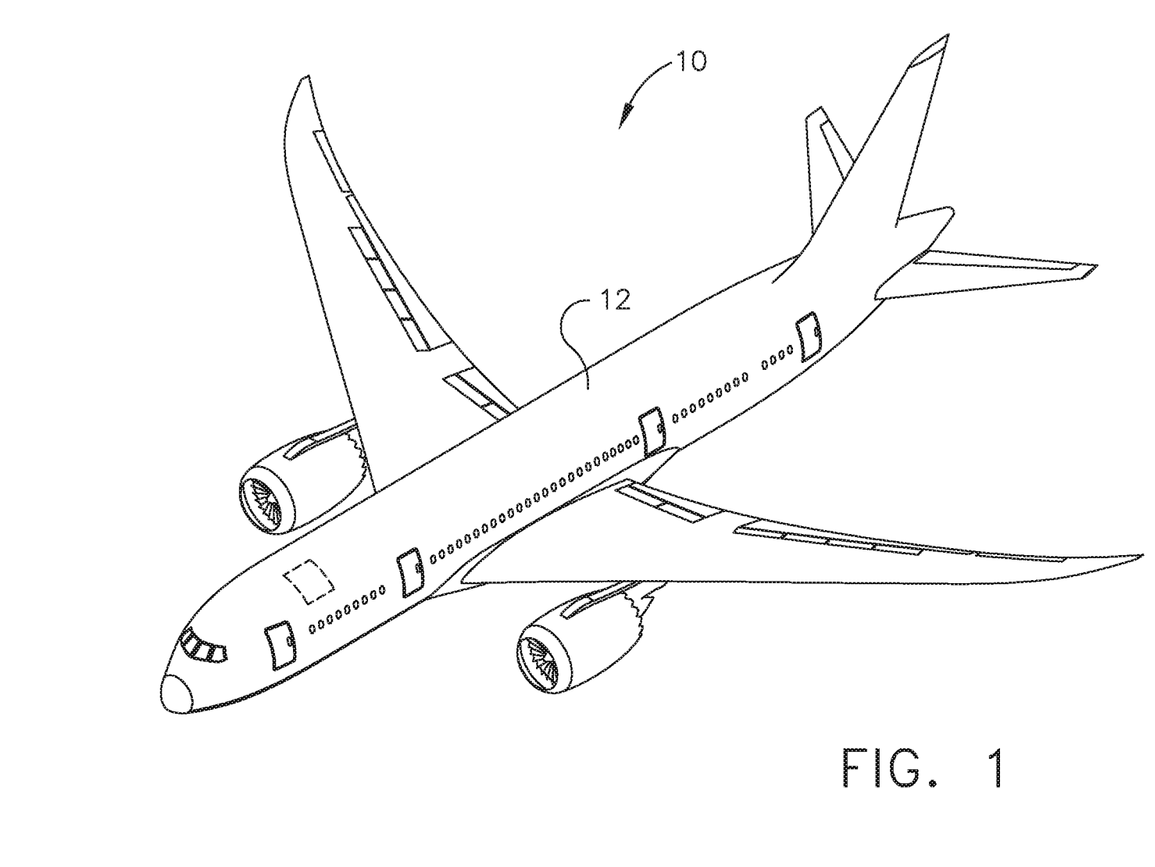
FIG. 1 is a perspective view of an aircraft.
Figure 2:
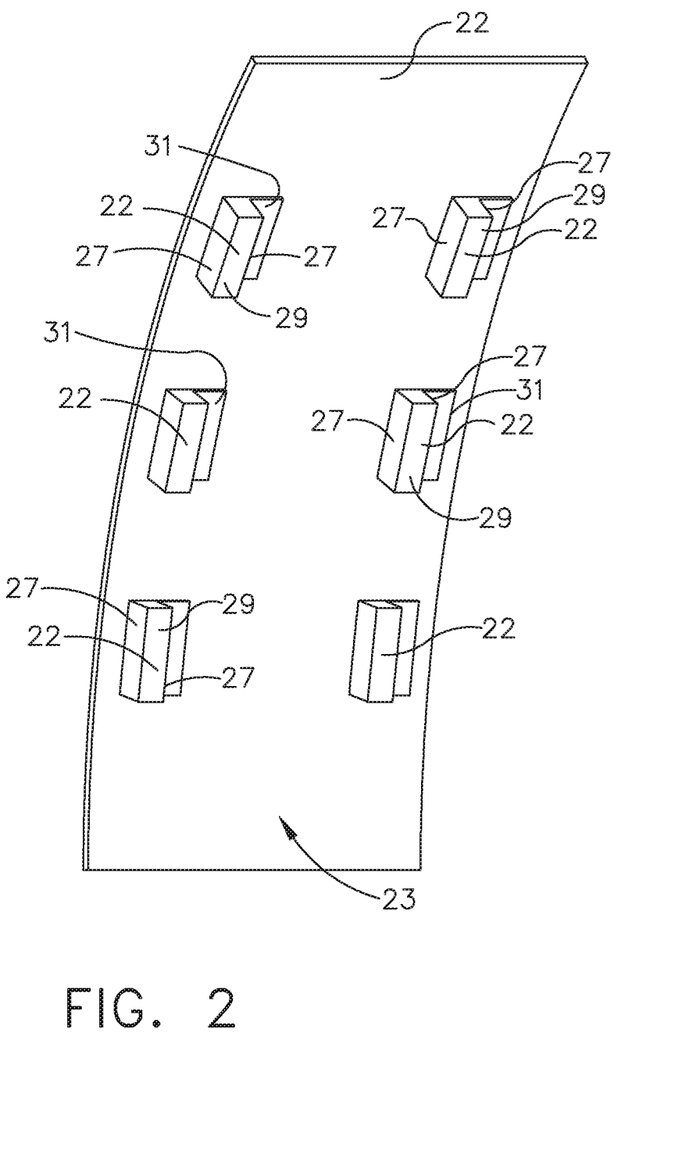
FIG. 2 is a perspective interior side view of a portion of a fuselage mandrel for constructing a fuselage skin of the aircraft of FIG. 1.

In referring to FIG. 1, aircraft 10 has fuselage 12, which provides for other structures within aircraft 10, such as for example frame components (not shown in FIG. 1) of aircraft 10. As earlier mentioned, frame components are secured to fuselage 12 by way of drilling a hole in fuselage 12 and through a shear tie connector and securing the shear tie connector to fuselage 12 with a straight shank fastener. The shear tie connector was in turn fastened to the frame components thereby creating a securement between the frame and fuselage 12. However, this resulted in drilling a large number of holes positioned through fuselage 12.

Figure 4:
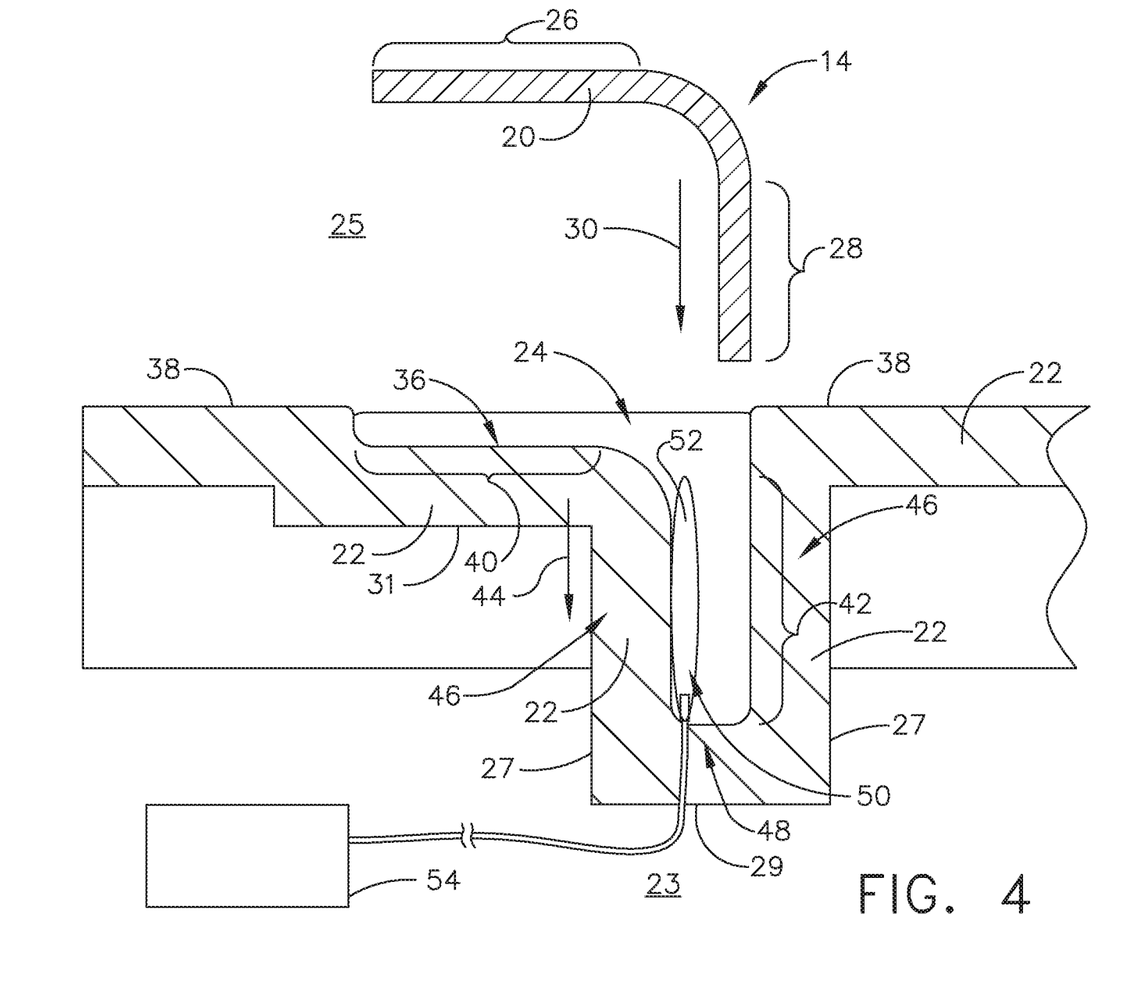
FIG. 4 is a cross section view taken along line 4-4 in FIG.3, showing an example of a shear tie connector retention assembly in a shear tie receptacle for retaining the shear tie connector in the receptacle of the fuselage mandrel during composite ply layup of the fuselage skin.
Figure 5:
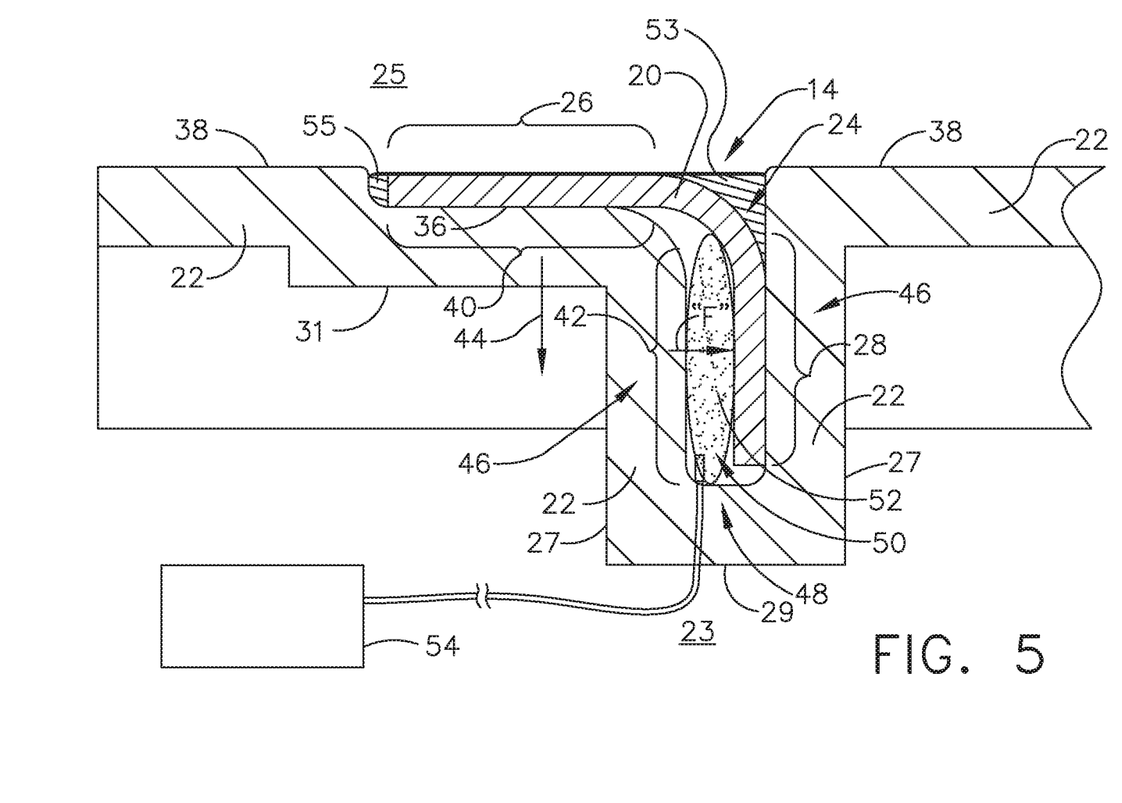
FIG. 5 is the view of FIG. 4 with the shear tie connector retained within the receptacle of the fuselage mandrel.
Figure 6:
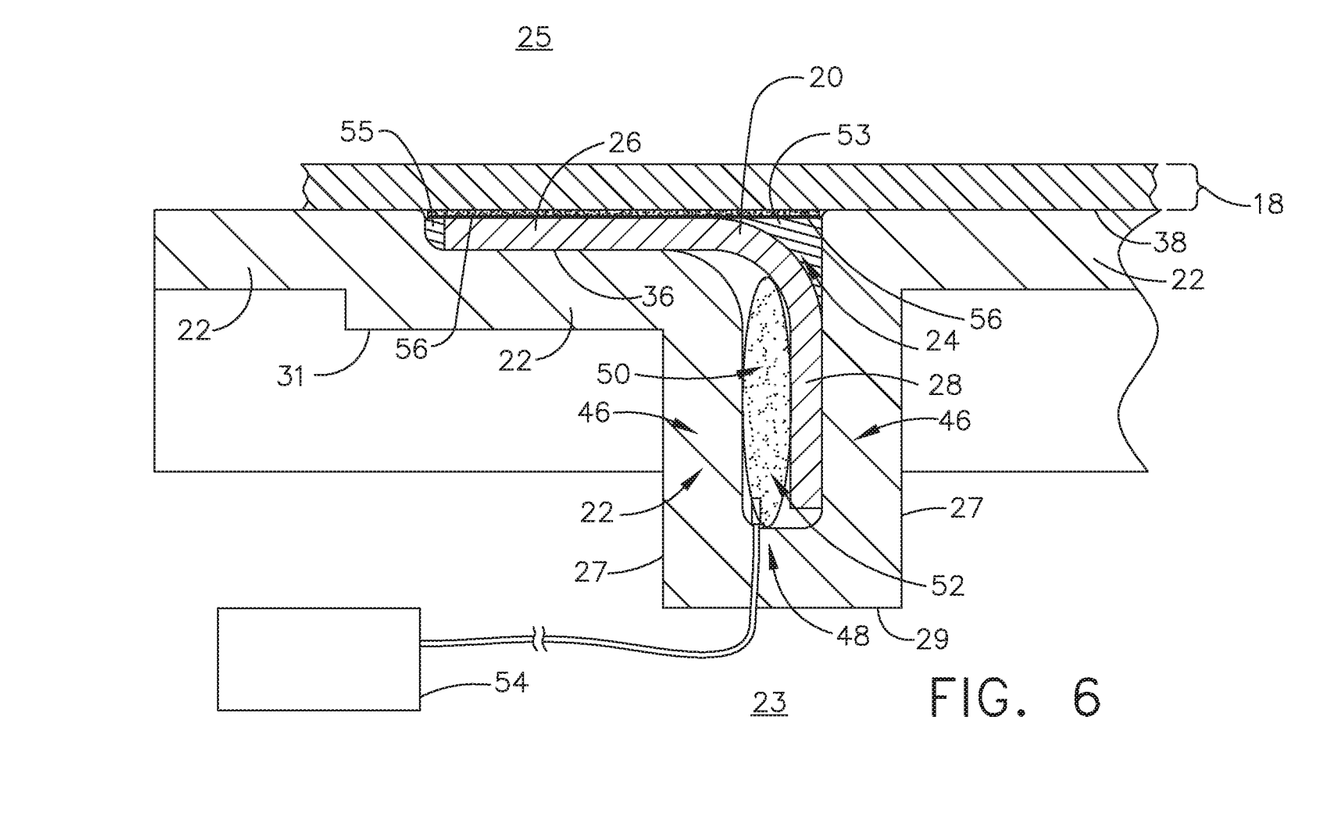
FIG. 6 is the view of FIG. 5 with the composite fuselage skin positioned on the fuselage mandrel.
Figure 7:
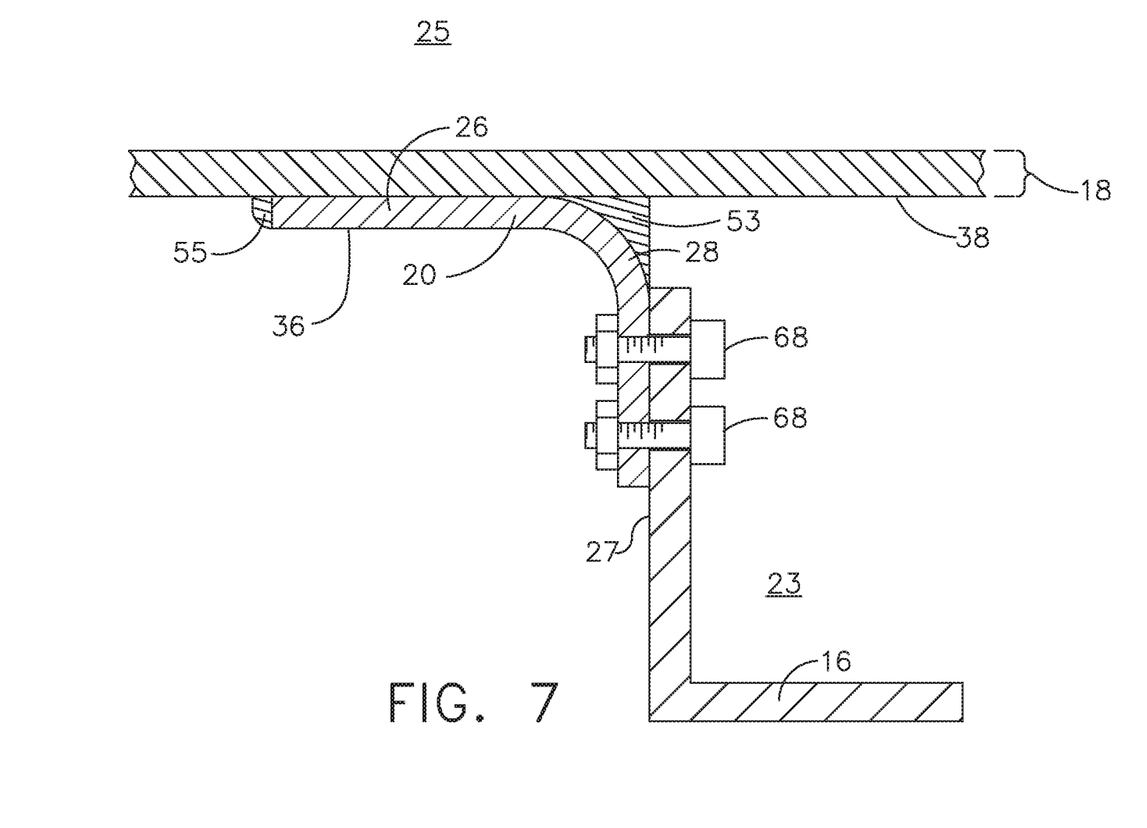
FIG. 7 is the view of FIG. 6 wherein the composite fuselage skin has been cured and a frame of the aircraft has been secured to a skin side portion of the shear tie connector.

In referring to FIGS. 2-5 shear tie connector system 14, for securing frame 16 to composite fuselage skin 18 as seen in FIGS. 6 and 7. Shear tie connector system 14 includes shear tie connector 20 and fuselage mandrel 22, which defines slot 24 within which shear tie connector 20 is positioned. Shear tie connector 20 in this example is constructed of a cured composite material and includes skin side plate member 26 and frame side plate member 28 which extends from skin side plate member 26. Frame side plate member 28 extends in direction 30 transverse relative to skin side plate member 26.

Figure 3:
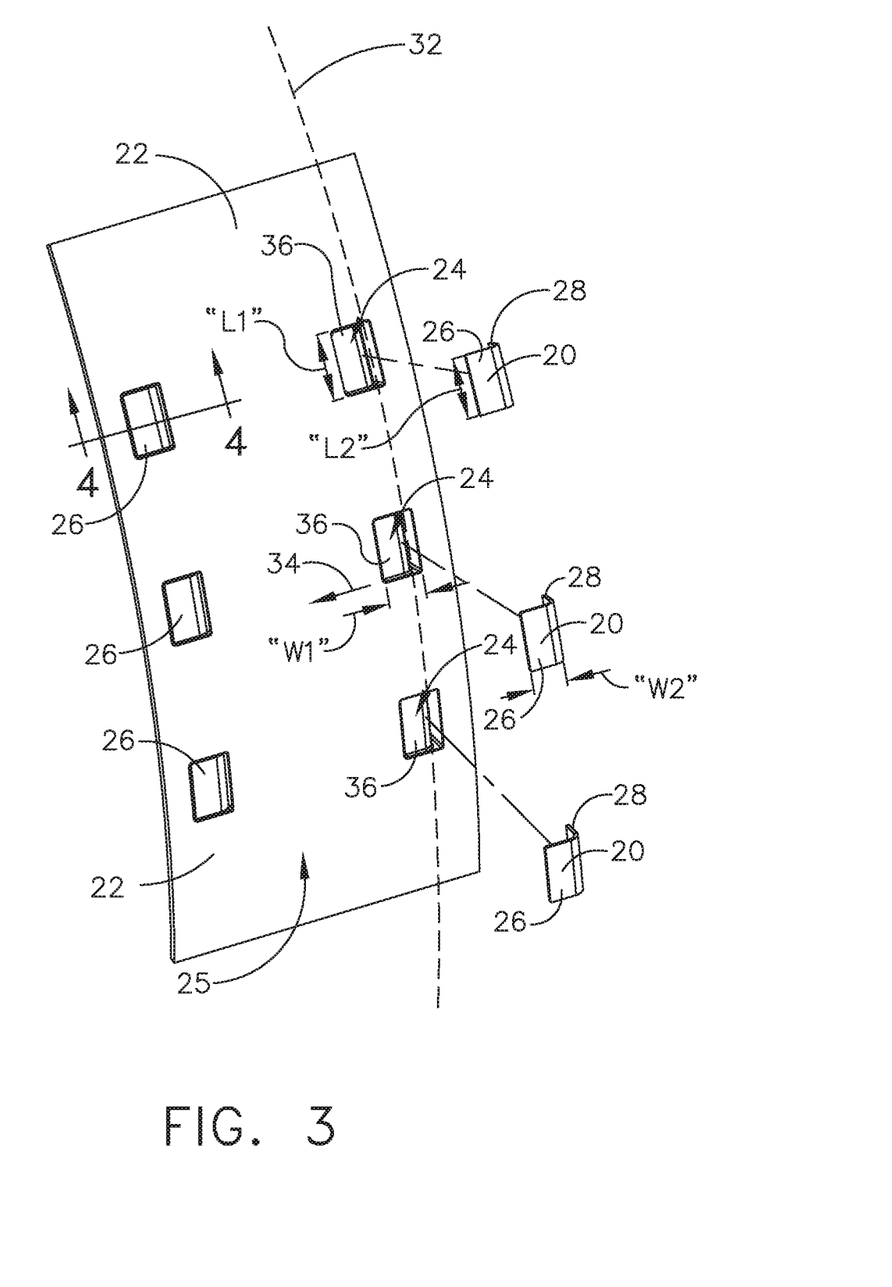
FIG. 3 is a perspective exterior side view of the portion of the fuselage mandrel of FIG. 2 with shear ties in an exploded view with respect to the fuselage mandrel.

Shear tie connector system includes plurality of slots 24 defined by fuselage mandrel 22, which are positioned spaced apart from one another as seen FIG. 3. Plurality of slots 24 are positioned along line of circumference 32 of fuselage mandrel 22. Each of the plurality of slots 24 defines length dimension "L1", which extends along of line of circumference 32 of fuselage mandrel 22, which is greater than length dimension "L2" of shear tie connector 20. Each of the plurality of slots 24 defines a width dimension "W1" which extends in direction 34 transverse to the line of circumference 32 of fuselage mandrel 22. Width dimension "W1" of each of the plurality of slots 24 is greater than width dimension "W2" of shear tie connector 20. With length dimension "L1" of slot 24 being greater than length dimension "L2" of shear tie connector 20 and with width dimension "W1" of slot 24 than width dimension "W2" of shear tie connector 20, shear tie connector 20 is able to be inserted into slot 24. Slot 24 includes recessed surface 36, as seen in FIGS. 4 and 5, positioned within fuselage mandrel 22 spaced apart from outer surface 38 of fuselage mandrel 22. Recessed surface 36 extends along the first portion 40 of slot 24, as seen in FIG. 5, such that with shear tie connector 20 positioned within slot 24, skin side plate member 26 of shear tie connector 20 extends along first portion 40 of slot 24 without extending outside of slot 24 or otherwise above outer surface 38. In this example, shear tie connector 20 is positioned slightly below outer surface 38 of fuselage mandrel 22 so as to at least accommodate a layer of adhesive to be positioned in overlying relationship with skin side plate member 26 and be in alignment with outer surface 38 of fuselage mandrel 22, as will be discussed further herein.

As seen in FIGS. 4 and 5, slot 24 includes second portion 42 of slot 24, which extends in direction 44 transverse to first portion 40 of slot 24 and extends away from outer surface 38 of fuselage mandrel 22. Second portion 42 of the slot is defined by a pair of spaced apart sidewall portions 46 of fuselage mandrel 22 and end wall portion 48 which extends between pair of spaced apart sidewall portions 46. Second portion 42 of slot 24 receives frame side plate member 28 of shear tie connector 20.

In referring to FIGS. 2, 4, 6 and 7 an interior side 23 of fuselage mandrel 22 is seen, in contrast to exterior side 25 of fuselage mandrel as shown in FIG. 3. On interior side 23 of fuselage mandrel 22 outer side surfaces 27 of pair of spaced apart sidewall portions 46 are seen as well as outer side surface 29 of end wall portion 48. In addition, outer side surface 31 of fuselage mandrel 22 is seen which is positioned in relationship with recessed surface 36 of slot 24.

In referring to FIGS. 4 and 5, retention member 50 is positioned within second portion 42 of slot 24. Retention member 50 in this example includes an inflatable bladder 52. In FIG. 4 inflatable bladder 52 is not fully inflated and with positioning frame side plate member 28 within second portion of slot 24, inflatable bladder 52 is inflated from pressurized air source 54 as seen in FIG. 5. The inflation of inflatable bladder 52 results in inflatable bladder 52 applying force "F" onto frame side plate member 28 pushing frame side plate member 28 against one of pair of spaced apart sidewall portions 46. As a result, shear tie connector 20 is retained and secured within slot 24. The retention provides placing shear tie connectors 20 at any position about fuselage mandrel 22 without experiencing any movement of the shear tie connectors as a result of gravitational forces which would affect positioning and securement of shear tie connector 20 at the time of wrapping of the composite material in constructing fuselage 12. Numerous of different types of retention members can be employed to retain shear tie connector 20 within slot 24. These retention members, for example, could include springs, shims or other items that would position within slot 24 and secure shear tie connector 20 within slot 24. In addition, first composite gap filler 53 and second composite gap filler 55 are positioned within slot 24 filling in gaps between shear tie connector 20 and fuselage mandrel 22, as seen in FIG. 5. With first and second composite gap fillers 53 and 55 installed aligned with outer surface 38 of fuselage mandrel 22, the alignment with outer surface 38 prevents undulations imparted to fuselage skin 18 with the curing of the first and second composite gap fillers 53, 55 during the co-bonding of fuselage skin 18 and shear tie connector 20.

Shear tie connector system 14 further includes in this example an adhesive 56, as seen in FIGS. 6 and 7, positioned overlying skin side plate member 26 of shear tie connector 20. Adhesive 56 provides an essential role in co-bonding cured shear tie connector 20 to an uncured fuselage skin 18, as seen in FIG. 6, and facilitating co-bonding of the components through a chemical bond to become more like a single part after the co-bonding rather than two separate parts secured together. Many different constructions of fuselage skin 18 can be employed which include composite material and which overlies shear tie connector 20 and slot 24, as well as, fuselage mandrel 22. In the example of fuselage skin 18, as seen in FIG. 6, fuselage skin 18 can include a tackifier (not shown) which overlies adhesive 56 and fuselage mandrel 22. A tackifier is positioned overlying adhesive 56 and fuselage mandrel 22 so as to reduce ply shifting during assembly. Composite material is positioned in overlying relationship with respect to the tackifier. In various constructions of fuselage skin 18 selected by the fabricator, other materials may be positioned between the composite material and the tackifier with the composite material still considered in overlying relationship with respect to the tackifier. With shear tie connector system 14 assembled, co-bonding is performed which secures shear tie connector 20 to composite fuselage skin 18, which has been cured as seen in FIG. 7, and provides securement between shear tie connector 20 and fuselage skin 18 cured without a need for drilling holes through fuselage 12 and extending fasteners through fuselage 12. With shear tie connector 20 secured to fuselage skin 18, fuselage mandrel 22 is removed from fuselage skin 18 by, for example, collapsing of fuselage mandrel 22. Frame 16 is fastened to frame side plate member 28, as seen in FIG. 7, with fasteners 68.

Figure 8:
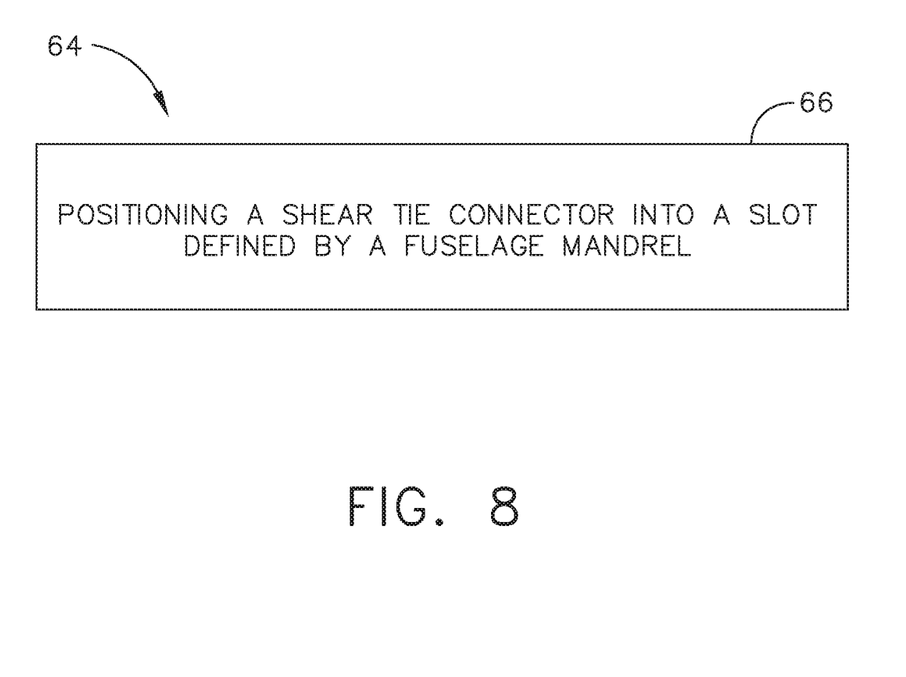
FIG. 8 is a flow chart for securing a shear tie connector to a composite fuselage skin of an aircraft.

Method 64 for installing shear tie connector system 14 includes positioning 66 shear tie connector 20 into slot 24 defined by fuselage mandrel 22. Shear tie connector 20 includes skin side plate member 26 and frame side plate member 28, which extends from skin side plate member 26 in direction 30 transverse relative to skin side plate member 26. In this example, frame side plate member 28 and frame 16 can each be fabricated with full sized holes. This can be employed with the location of the frame side plate member 28 being reliably placed in a predetermined connecting position with the co-bonding of shear tie connector 20 to fuselage skin 18. The holes for connecting frame 16 to frame side plate member 28 can also be matched drilled, drilled with use of a drill template or other methodologies which provide for reliable and efficient connecting of frame 16 to shear tie connector 20. Method 64 further includes plurality of slots 24 positioned spaced apart from one another along line of circumference 32 of fuselage mandrel 22.

Method 64, further includes plurality of shear tie connectors 20. Each shear tie connector 20 is positioned within one of plurality of slots 24. Each skin side plate member 26 extends within the one of the plurality of slots 24 and along an exterior side 25 of fuselage mandrel 22. Frame side plate member 28 extends away from exterior side 25 of fuselage mandrel 22.

Method 64 further includes retaining each of the plurality of shear tie connectors 20 within one of the plurality of slots 24. In addition, first composite gap filler 53 and second composite gap filler 55 are positioned within slot 24 as seen in FIG. 5, wherein first and second composite gap fillers 53, 55 are positioned between shear tie connector 20 and fuselage mandrel 22. Positioning of first and second composite gap fillers 53, 55 to be aligned with outer surface 38 of fuselage mandrel 22, prevents undulation being imparted to fuselage skin 18 with curing of the first and second composite gap fillers 53, 55 during co-bonding of shear tie connector 20 with fuselage skin 18. With retaining of each shear tie connector 20, method 64 further includes overlying an adhesive 56 with respect to the skin side plate member 26 for facilitating co-bonding of the shear tie connector 20 to fuselage skin 18. An example of fuselage skin 18, as mentioned above, includes a tackifier (not shown) within fuselage skin 18 which overlies the adhesive and fuselage mandrel 22. In addition, in this example, a composite material (not shown) is within fuselage skin 18 positioned in overlying relationship with respect to the tackifier. As mentioned earlier, fabricators may by design choice place other materials between the composite material and the tackifier wherein the composite material is still considered in overlying relationship with respect to the tackifier. With cobonding shear tie connector 20 to fuselage skin 18, shear tie connector 20 is secured to fuselage skin 18 without a need for fasteners to be passed through fuselage skin 18 for securement of shear tie connectors 20 to fuselage skin 18.

While various embodiments have been described above, this disclosure is not intended to be limited thereto. Variations can be made to the disclosed embodiments that are still within the scope of the appended claims.

What is claimed is:

1. A shear tie connector system for securing a frame to a composite fuselage skin, comprising:
    a shear tie connector; and
    a fuselage mandrel, which defines a slot within which the shear tie connector is positioned, wherein:
        the slot comprises a recessed surface positioned within the fuselage mandrel spaced apart from an outer surface of the fuselage mandrel;
        a first portion of the slot has the recessed surface which extends along the first portion of the slot, such that with the shear tie connector positioned within the slot on the recessed surface, a skin side plate member of the shear tie connector extends along the first portion of the slot without extending beyond the outer surface of the fuselage mandrel;
        the slot comprises a second portion of the slot, which extends in a direction transverse to the first portion of the slot and extends away from the outer surface of the fuselage mandrel;
        the second portion of the slot is defined by a pair of spaced apart sidewall portions of the fuselage mandrel with an end wall portion which extends between the pair of spaced apart sidewall portions;
        the second portion of the slot receives a frame side plate member of the shear tie connector; and
        a retention member is positioned within the second portion of the slot, which applies a force against the frame side plate member positioning the frame side plate member against one of the pair of spaced apart sidewall portions.

2. The shear tie connector system of claim 1, wherein the frame side plate member extends in a direction transverse relative to the skin side plate member.

3. The shear tie connector system of claim 1, further includes a plurality of slots defined by the fuselage mandrel, which are positioned spaced apart from one another.

4. The shear tie connector system of claim 3, wherein the plurality of slots is positioned along a line of circumference of the fuselage mandrel.

5. The shear tie connector system of claim 4, wherein each of the plurality of slots defines a length dimension, which extends along of the line of circumference of the fuselage mandrel, which is greater than a length dimension of the shear tie connector.

6. The shear tie connector system of claim 4, wherein each of the plurality of slots defines a width dimension which extends in a direction transverse to the line of circumference of the fuselage mandrel.

7. The shear tie connector system of claim 6, wherein the width dimension of each of the plurality of slots is greater than a width dimension of the shear tie connector.

8. The shear tie connector system of claim 1, wherein the retention member comprises an inflatable bladder.

9. A shear tie connector system for securing a frame to a composite fuselage skin, comprising:
    a shear tie connector;
    a fuselage mandrel, which defines a slot within which the shear tie connector is positioned: and
    a first composite gap filler positioned between the shear tie connector and the fuselage mandrel and a second composite gap filler positioned between the shear tie connector and the fuselage mandrel.

10. The shear tie connector system of claim 9, further includes:
    an adhesive positioned overlying a skin side plate member of the shear tie connector;
    a tackifier positioned overlying the adhesive; and
    a composite material positioned in overlying relationship relative to the tackifier.

11. The shear tie connector system of claim 9, wherein the slot includes a recessed surface positioned within the fuselage mandrel spaced apart from an outer surface of the fuselage mandrel.

12. The shear tie connector system of claim 11, wherein a first portion of the slot has the recessed surface which extends along the portion of the slot such that with the shear tie connector positioned within the slot on the recessed surface, a skin side plate member of the shear tie connector extends along the first portion of the slot without extending beyond the outer surface of the fuselage mandrel.

13. The shear tie connector system of claim 12, wherein the slot includes a second portion of the slot, which extends in a direction transverse to the first portion of the slot and extends away from the outer surface of the fuselage mandrel.

14. The shear tie connector system of claim 13, wherein:
the second portion of the slot is defined by a pair of spaced apart sidewall portions of the fuselage mandrel and an end wall portion which extends between the pair of spaced apart sidewall portions; and
the second portion of the slot receives a frame side plate member of the shear tie connector.

15. The shear tie connector system of claim 14, further includes a retention member positioned within the second portion of the slot, which applies a force against the frame side plate member positioning the frame side plate member against one of the pair of spaced apart sidewall portions.

16. A method for installing a shear tie connector system, comprising:
positioning a shear tie connector into a slot defined by a fuselage mandrel, wherein the shear tie connector comprises a skin side plate member and a frame side plate member, which extends from the skin side plate member in a direction transverse relative to the skin side plate member, wherein positioning further includes:
overlying an adhesive with respect to the skin side plate member;
overlying a tackifier with respect to the adhesive; and
overlying composite material relative to the tackifier.

17. The method of claim 16, further including a plurality of slots positioned spaced apart from one another along a line of circumference of the fuselage mandrel.

18. The method of claim 17, further including a plurality of shear tie connectors wherein:
each of the plurality of shear tie connectors is positioned within one of the plurality of slots;
each skin side plate member of the plurality of shear tie connectors extends within the one of the plurality of slots and along an exterior side of the fuselage mandrel; and
each frame side plate member of the plurality of shear tie connectors extends away from the exterior side of the fuselage mandrel.

19. The method of claim 16 wherein:
positioning of the shear tie connector includes positioning the skin side plate member on a recessed surface of the slot, wherein the recessed surface is positioned spaced apart from an outer surface of the fuselage mandrel; and
a first portion of the slot has the recessed surface which extends along the first portion of the slot, such that with the shear tie connector positioned within the slot on the recessed surface, the skin side plate member of the shear tie connector extends along the first portion of the slot without extending beyond the outer surface of the fuselage mandrel.

20. The method of claim 19 wherein:
the slot comprises a second portion of the slot, which extends in a direction transverse to the first portion of the slot and extends away from the outer surface of the fuselage mandrel;
the second portion of the slot is defined by a pair of spaced apart sidewall portions of the fuselage mandrel with an end wall portion which extends between the pair of spaced apart sidewall portions;
the second portion of the slot receives the frame side plate member of the shear tie connector; and
a retention member is positioned within the second portion of the slot, which applies a force against the frame side plate member positioning the frame side plate member against one of the pair of spaced apart sidewall portions.

* * * * *